United States Patent

[11] 3,540,763

| [72] | Inventor | Alfred A. Yee |
| | | 3169 Alika Ave., Honolulu, Hawaii 96817 |
| [21] | Appl. No. | 740,646 |
| [22] | Filed | June 27, 1968 |
| [45] | Patented | Nov. 17, 1970 |

[54] SPLICE SLEEVE FOR REINFORCING BARS
2 Claims, 1 Drawing Fig.

[52] U.S. Cl. .................................................. 287/108
[51] Int. Cl. .................................................. F16d 7/00
[50] Field of Search .................................... 287/108,
117; 52/726; 285/294, 296, 292

[56] References Cited
UNITED STATES PATENTS
| 1,277,976 | 9/1918 | Mann ........................ | 285/296 |
| 1,689,281 | 10/1928 | Forssell .................... | 287/108 |
| 1,849,808 | 3/1932 | Seward ..................... | 285/292X |
| 1,960,249 | 5/1934 | Mano ........................ | 285/292 |

FOREIGN PATENTS
| 1,058 | 1865 | Great Britain ............... | 285/294 |

Primary Examiner—David J. Williamowsky
Assistant Examiner—Andrew V. Kundrat
Attorney—Clarence A. O'Brien and Harvey B. Jacobson ABSTRACT: An elongated one piece splice sleeve adapted to receive adjoining ends of a pair of reinforcing bars which are locked within the sleeve through the utilization of an expanding grout. The sleeve is provided with a series of grout receiving internal grooves orientated generally transversely of the sleeve throughout the full length thereof with the interior of the sleeve, as well as the exterior thereof, having a maximum diameter at a generally central point and tapering outwardly in opposed directions to relatively smaller diameters at the opposite rod receiving ends to provide a wedge-type locking effect on the bars upon the hardening of the grout.

Patented Nov. 17, 1970
3,540,763
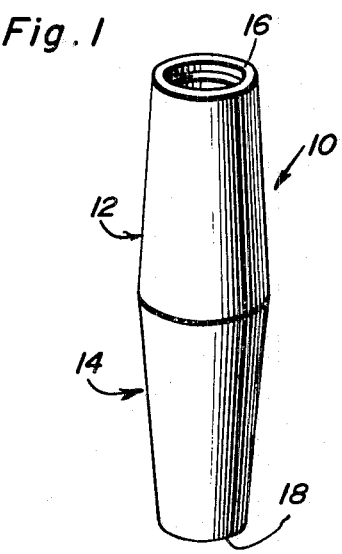
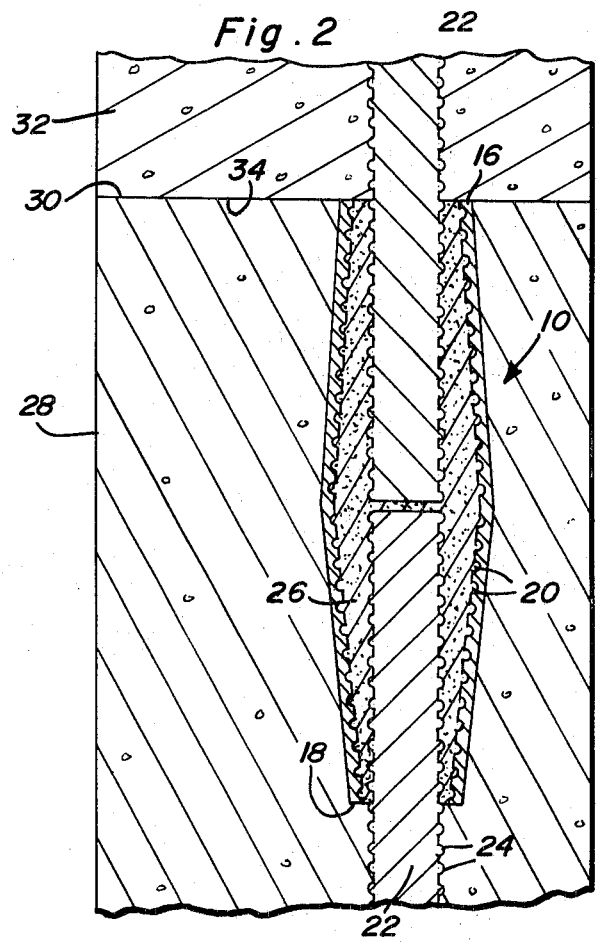
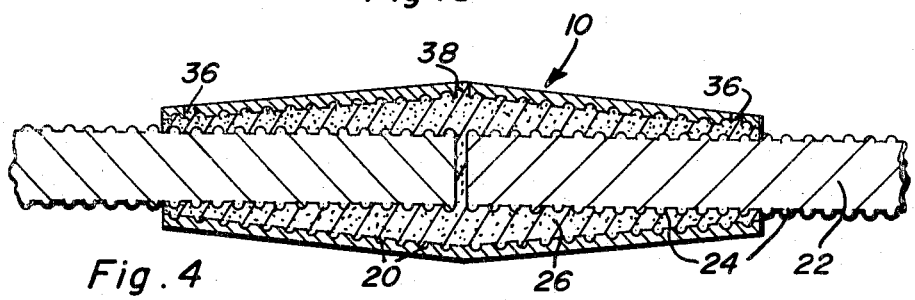
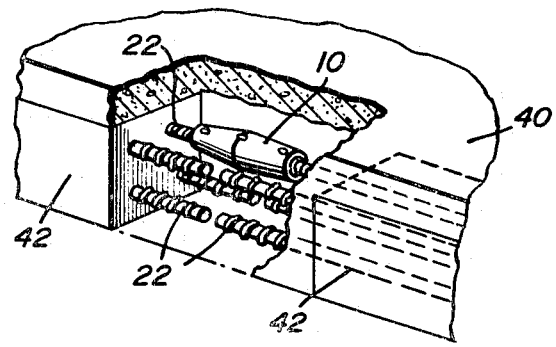
Alfred A. Yee
INVENTOR.
BY *Clarence A. O'Brien*
*and Harvey B. Jacobson*
Attorneys 3,540,763

SPLICE SLEEVE FOR REINFORCING BARS

The instant invention is concerned with the joining or splicing of reinforcing bars, and more particularly relates to a unique tension accommodating splice sleeve which receives the adjoining ends of a pair of rods to be joined in addition to an appropriate expanding grout utilized in locking the rods or bars within the sleeve.

As will be appreciated by those familiar with the art, splicing sleeves for reinforcing bars are generally known, such sleeves functioning primarily to align the bars for the accommodation of compression across the joint, and being incapable of accommodating tension. It is a primary object of the instant invention to provide a splice sleeve which, while clearly capable of both aligning the rods and providing for the accommodation of a compressive force across the joint therebetween, is particularly adapted for the accommodation of tension. This is effected by specifically configuring the interior of the splice sleeve in a manner whereby an inserted fill of expanding grout will, upon hardening, cooperate with the sleeve in providing for a positive wedging action resisting movement of the joined rod ends. The wedging type locking of the rods is supplemented by an actual intimate engagement of the rod locking grout with a series of internal grooves formed within the opposed frustum shaped portions of the sleeve, as well as the ribs defined on the rods themselves. Other significant aspects of the sleeve reside in the selective provision of one rod receiving end of a slightly greater diameter, while still maintaining the tapered configuration, so as to facilitate the alignment of precast units. Further, appropriate grout injection and air venting holes can also be provided, particularly in cast-in-place construction.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIG. 1 is a perspective view of the splice sleeve of the instant invention;

FIG. 2 is an enlarged cross-sectional view through a rod joint utilizing the splice sleeve of the instant invention;

FIG. 3 is a cross-sectional view through a rod joint with the sleeve including grout injecting and air venting apertures; and FIG. 4 is a perspective detail, with portions broken away, illustrating one application of the splice sleeve when cast-in-place construction is involved.

Referring now more specifically to the drawings, reference numeral 10 is used to generally designate the splice sleeve of the instant invention. This sleeve 10, noting FIGS. 1 and 2 in particular, is to be of one-piece construction, preferably cast steel, and be of a shape which might be described as two conical frustum portions 12 and 14 positioned base to base. Both portions 12 and 14 are smoothly tapered, both interiorly and exteriorly, with a maximum diameter at the generally central meeting point with the other portion and with a minimum diameter at the corresponding outer end 16 or 18.

The exterior surface of the sleeve 10 will preferably be smooth, while the interior surface thereof is provided with a series of longitudinally spaced generally transverse elongated grooves 20 along the full length of the sleeve 10. These grooves 20 can, as an example, be formed with a one-eighth inch radius and at a spacing of approximately one-eighth inch from each other, orientated either annularly or helically about the interior of the sleeve 10. If helically arranged, the grooves 20 can in fact form a continuous spiral along the interior of the sleeve. These internal peripheral grooves 20 along with the tapered internal construction of the sleeve 10 contribute to provide a highly efficient tension-accommodating splice.

Basically, a pair of reinforcing rods or bars 22, having protrusions or ribs 24 thereon, are introduced into the sleeve 10 from the opposite ends thereof and the sleeve 10 filled with an appropriate expanding grout 26, such as Kemox-G, a product of Sika Chemical Corp. or Embeco, a product of Masterbuilders Corp. After the grout 26 hardens and expands into intimate contact with the grooved tapered interior of the sleeve and the ribbed exterior of the rods 22 a positive locking of the rods 22 within the sleeve 10 is effected. The tapered interior construction of the sleeve 10 is of significance in effecting a positive lock for each of the rods 22 within the sleeve 10 in that outward movement of the rods 22 is effectively resisted both by the intimate engagement of the grout 26 with the rod and sleeve and by the wedging effect produced by the tapered inwardly enlarged configuration of the solidified grout 26.

FIG. 2 is of particular interest in showing one adaptation of the sleeve 10 utilized in the assembly of precast sections. With such an arrangement, the lower section 28, comprising for example a precast column, will be formed with the sleeve 10 embedded therein and flush with the top 30, the reinforcing rod or bar 22 of this lower column 28 terminating at a central point along the length of the sleeve 10 corresponding to the point at which the diameter of the sleeve 10 is at its maximum. The second precast section, which may be in the nature of an upper column 32, is formed with the reinforcing bar 22 therein projecting beyond the lower face 34 a distance contemplated to enable its insertion within the sleeve 10 to the maximum diameter thereof just short of the lower bar 22 upon and engagement of the bottom face 34 of the upper member 32 with the top face 30 of the lower member 28. Thus, just prior to a positioning of the upper member 32, the sleeve 10 will be filled with the expanding grout 26 through the open upper end of the sleeve, after which the upper column or member 32 will be positioned with the introduction of the downwardly extending end of the rod 22 forcing the grout 26 into intimate contact with the rods and grooved internal surface of the sleeve. When the grout 26 hardens, expanding during the process, the permanent wedge-type joint desired results. Incidentally, in order to facilitate the alignment of the precast sections 28 and 32, the upper or rod-receiving end 16 of the sleeve 10 can be slightly enlarged relative to the lower embedded end 18 of the sleeve 10. However, the diameter of the end 16 is still to be substantially less than that at the central portion of the sleeve 10 so as to still provide for the formation of a grout "wedge".

In a related environment, noting FIGS. 3 and 4 in particular, the sleeve 10 is equally adaptable for use in joining a pair of exposed reinforcing rods or bars which are subsequently to be embedded within a pour. In this instance, inasmuch as the bars or rods 22 can be adjusted prior to a mounting of the sleeve 10, the extra fitting tolerance provided by enlarging one end of the sleeve, as in regard to the showing in FIG. 2, is not necessary. When the sleeve 10 is to be utilized in joining two exposed rods 22, the sleeve can include holes 36 for the injection of the grout, normally located toward the ends of the sleeve 10, as well as one or more centrally located air venting holes 38. Thus, the rods 22 can be initially aligned and inserted in the opposed ends of the sleeve 10 and the grout 26 subsequently pressure injected. Incidentally, if deemed necessary, appropriate seals can be provided at the opposite ends of the sleeve 10 for containing the grout until solidified.

It will of course be appreciated that, in FIG. 4, for purposes of simplicity, only one of the four sets of rods to be joined has been illustrated as having the splice sleeve 10 of the instant invention thereon. In actual practice, all four sets of rods will be joined by sleeves 10 prior to a completion of the poured deck 40 between the ends of the space beams 42.

From the foregoing, it will be appreciated that a highly unique splice sleeve has been defined, this sleeve incorporating a unique internally tapered configuration which provides for a positive wedgelike retaining of the grout encased ends of the rods. In addition, grout locking grooves are provided about the curved inner surface of the sleeve throughout the full length thereof thus providing for an intimate engagement of the grout with the sleeve, the conventionally provided ribs on the reinforcing bars similarly providing for such an intimate engagement of the grout with the bars.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

I claim:

1. A splice sleeve for providing a tension accommodating joint between a pair of solid reinforcing bars in concrete construction, said sleeve comprising an elongated hollow grout receiving body having opposed open ends for the reception of the adjacent ends of a pair of bars to be joined, said body having an interior configuration tapering substantially constantly from a maximum diameter at a central point between the ends outward to a reduced diameter at each of said open ends, said interior configuration being defined by an interior sleeve surface, said interior sleeve surface including means for intimately locking grout directly thereto, said grout locking means comprising generally transverse groove means defined in and longitudinally spaced along substantially the full length of the interior of said body for the accommodation of grout therein, one of said open ends being of a diameter greater than that of the other end, whereby an alignment of a second introduced bar is facilitated.

2. In concrete construction, a pair of longitudinally aligned reinforcing bar ends, an elongated hollow splice sleeve, said splice sleeve having opposed open ends, said reinforcing bar ends being received through the open ends of the sleeve and projecting thereinto to a generally central point, said sleeve, at said generally central point, being of an enlarged internal diameter, the internal diameter of said sleeve tapering generally outward from said central point to the opposed open ends of said sleeve, rod end embedding expanding grout filling said sleeve and locking the two rod ends therein, said grout, upon solidifying, having an expended rigid tapered configuration complementing and intimately engaging the full extent of the interior of the sleeve and providing a wedge-type reaction to any outward force introduced on the rod ends, grout locking grooves provided peripherally about the interior of the sleeve at longitudinally spaced points therealong for an accommodation of the expanded grout, the interior of said sleeve, between the generally central maximum diameter point and each end, being in the shape of a conical frustum, one of said open ends being of a diameter greater than that of the other end.